United States Patent Office 2,736,681
Patented Feb. 28, 1956

2,736,681

CHEMICAL COMPOUNDS

Max Tishler, Westfield, N. J., assignor to Merck & Co., Inc., Rahway, N. J., a corporation of New Jersey No Drawing. Application February 11, 1955,
Serial No. 487,720

5 Claims. (Cl. 167—65)

This invention relates to a novel 21-ester of 9α-fluorohydrocortisone and to processes for preparing this ester.

This application is a continuation-in-part of my copending application Serial No. 440,292, filed June 29, 1954.

Hydrocortisone tertiary-butylacetate (4-pregnene-11β,- 17α, 21-triol-3,20,dione 21-tertiary butylacetate) has been found to be of particular value in the treatment of rheumatoid or osteoarthritic joints, in that it results in the relief of symptoms of rheumatism to a degree one and one-half to two times greater than with hydrocortisone acetate with no apparent increase in side-effects. Hydrocortisone tertiary-butylacetate, although of great value in possessing high local activity, is lacking in systemic activity as compared to hydrocortisone acetate, thereby limiting its field of use.

An object of the invention is to provide a compound possessing high systemic activity as well as high local activity. Another object is to provide a compound having greater arthritic activity than the steroid compounds theretofore available. A further object is to provide such a compound which has the characteristic of prolonged activity. Other objects and the advantages of the invention will appear hereinafter.

In accordance with the invention, it is now found that 9α-fluorohydrocortisone tertiary-butylacetate of the formula—

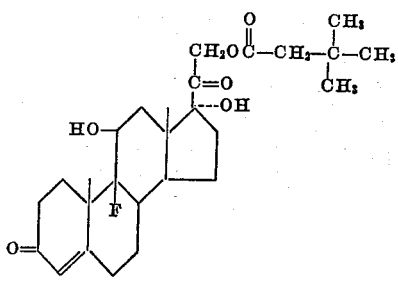

possesses unexpected properties which make it of great value in hormone therapy. This is unique in its action when compared with other esters of 9α-fluorohydrocortisone (9α-fluoro-4-pregnene-11β,17α,21-triol-3,20-dione) as well as with hydrocortisone tertiary-butylacetate, in that it not only possesses all of the advantages of these two compounds, but also has distinct additional advantageous properties. For example, it has been determined that 9α-fluorohydrocortisone tertiary-butylacetate has both high systemic activity and high local activity as compared to hydrocortisone acetate. In addition, 9α-fluorohydrocortisone tertiary-butylacetate is one and one-half to two times more active locally than 9α-fluorohydrocortisone acetate, and also has a greater systemic activity. The distinguishing characteristic of greatest importance of 9α-fluorohydrocortisone tertiary-butylacetate is, however, its high degree of prolonged activity both systematically and locally. This ester is quite remarkable in that it possesses an extremely high activity and still has the characteristic of being slowly dissipated thereby greatly extending its activity over a prolonged period of time. This prolonged activity makes it possible to limit the instances of injection or application of the active material to at least one-third of that which was heretofore required.

The new compound, 9α-fluorohydrocortisone tertiary-butylacetate can be prepared by reacting tertiary-butylacetyl chloride with 9α-fluorohydrocortisone in the presence of a base. This reaction is conveniently accomplished by adding tertiary-butylacetyl chloride to a cold solution of 9α-fluorohydrocortisone in a mixture of chloroform and pyridine. The mixture is allowed to stand in the cold until the conversion of 9α-fluorohydrocortisone to the ester is complete. The product is recovered by adding water to the resulting reaction mixture and extracting the product from the mixture with chloroform. The chloroform solution is then evaporated under diminished pressure and the 9α-fluorohydrocortisone tertiary-butylacetate is obtained in the form of an oil which may be further purified by recrystallization from ethyl alcohol.

In accordance with another embodiment of the invention 9α-fluorohydrocortisone tertiary-butylacetate may be combined with pharmaceutical vehicles to produce therapeutic preparations useful in treating the various conditions where hydrocortisone acetate therapy has heretofore been required.

Pharmaceutically suitable suspensions of 9α-fluorohydrocortisone tertiary-butylacetate can be prepared which remain stable over extended periods of time. It is ordinarily preferred in such suspensions to employ an isotonic aqueous vehicle containing a surface active agent, a suspending agent, and a bacteriological preservative. The surface active agent, which functions to prevent the individual particles from coalescing, and the suspending agent, which increases the viscosity of the vehicle and thereby prevents rapid settling, are therefore important in the preparation of a practicable suspension adopted for parenteral administration. Although the bacteriological preservative has no effect on the stability of the suspension, a preservative such as benzyl alcohol, phenol, and the like, is required in a multiple dosage container to maintain sterility during actual use. It is ordinarily preferred to have the suspension isotonic in order to minimize irritation on injection. The suspension is ordinarily rendered isotonic by the addition thereto of sodium chloride. The surface active agents ordinarily utilized are polyoxyalkylene derivatives of sorbitol anhydride long chain fatty acid esters as for example, the polyoxyalkylene derivative of sorbitan monooleate (commercially available under the name "Tween 80" manufactured by the Atlas Powder Co., Wilmington, Delaware), and the like, as well as other surface active agents such as sodium lauryl sulfate, cetyl trimethyl ammonium bromide, benzalkonium chloride, and the like. As the suspending agent, it is preferred to employ sodium carboxy methylcellulose, methyl cellulose, gelatin, sodium alginate, and the like.

A topical composition can be prepared containing 9α-fluorohydrocortisone tertiary-butylacetate in the form of an aqueous solution, suspension or jelly. Examples of dermatological vehicles which can be used with active ingredients in topical compositions are vehicles of the water-soluble ointment base type, such as polyethylene glycols; vehicles which act as oils, such as the water immiscible olive oil or petrolatum, water-miscible oils, such as anhydrous wool fat, oil-in-water emulsions, such as vanishing creams, water-in-oil emulsions, such as hydrous wool fat, pastes such as a mixture of starch and petrolatum, collodions; vehicles which art as aqueous mixtures, such as aqueous solution, mixtures of zinc oxide and water, and jellies; and vehicles which act as powders, such as the hydrophylic powders, of which starch is an example or hydrophobic powders such as talc or zinc stearate. In addition, these suspensions and topical compositions can contain other hormones such as hydrocortisone or hydrocortisone acetate in addition to the 9α-fluorohydrocortisone tertiarybutylacetate to produce compositions containing all the desirable features of both components. Such suspensions and topical compositions art promptly in relieving the inflamed conditions such as in rheumatic joints and provide a remarkable prolonged relief of the symptoms.

The following examples are given for the purposes of illustration:

EXAMPLE 1

A portion of 9α-fluoro-4-pregnene-11β, 17α,21-triol-3, 20-dione (0.76 gram, 0.002 mole) was dissolved in a mixture of 3 milliliters of anhydrous pyridine and 3 milliliters of anhydrous dimethylformamide and the solution was chilled to 0° C. A solution of 0.30 gram (0.0022) mole of tertiary-butylacetylchloride in 2 milliliters dimethylformamide was added to the chilled mixture and the temperature rose to 8° C. The reaction mixture was held at 0° C. overnight (16 hours), and then diluted with 10 milliliters of water. Upon continued scratching the product crystallized. The mixture was cooled for six hours in the refrigerator and the crystals were then collected, washed with five 2 milliliters portions of ice-water and dried in vacuo. Yield 0.925 gram crude ester (97° of theory), melting point 217–221° C. The crude product (0.92 gram) was dissolved in 6 milliliters of boiling ethanol, filtered to remove fibers, and then washed with 2 milliliters of boiling ethanol. The filtrate was chilled to 0° C. overnight and the crystals were then collected, washed three times with one-half milliliter portions of ice-cold ethanol and dried in vacuo. Yield 0.55 gram (60%). Analysis calcd. for $C_{27}H_{39}O_6F$: C, 67.73; H, 8.21. Found: C, 68.04; H, 7.98.

EXAMPLE 2

A sample of 9α-fluorohydrocortisone free alcohol (8.0 g.) is added to 50 ml. dry pyridine in a 100 ml.-3-necked flask equipped with stirrer, dropping funnel, thermometer and vent guarded with drying tower. With stirring, the mixture is warmed to about 45° C., then cooled to 5° C. t-butylacetyl chloride (3.37 g.) is dripped in with stirring over a 15 minute period. The mixture is allowed to warm to room temperature and excess acid chloride is decomposed by cautious addition of 1 ml. cold water. The reaction mixture is transferred to a dropping funnel and added dropwise, over a one hour period, to 800 ml. vigorously stirred water. The aqueous suspension of solid ester is filtered and washed with 500 ml. water, 200 ml. 5% hydrochloric acid, 200 ml. water, 200 ml. 2% sodium bicarbonate, and 500 ml. water. The product is pressed as dry as possible, then triturated for 10 minutes with 50 ml. boiling ethanol. The slurry is allowed to cool, chilled to 0° C. for 16 hours, filtered and the crystalline product air dried, melting point 232–235° C. The product is dried in vacuo at 100° C. and 1 mm. Hg for 16 hours and there was obtained 9.65 g. (96%) of 9α-fluorohydrocortisone-5-butylacetate, M. P. 225–227° C. dec. λ max 2390, E%=377.

EXAMPLE 3

*Suspension of 9α-fluorohydrocortisone tertiary-butylacetate in aqueous vehicle*

A sterile saline suspension of 9α-fluorohydrocortisone tertiary-butylacetate was made as follows:

| | Grams |
|---|---|
| 9α-fluorohydrocortisone tertiary-butylacetate | 75 |
| Tween 80 (polyoxyalkylene derivative of sorbitan monooleate) | 12 |
| Sodium chloride | 27 |
| Sodium carboxymethyl cellulose | 15 |
| Benzyl alcohol | 27 |
| Distilled water to make 3000 milliliters. | |

A sterile aqueous vehicle containing the Tween 80, sodium chloride, sodium carboxymethyl cellulose, benzyl alcohol and the water and the sterile 9α-fluorohydrocortisone tertiary-butylacetate were added to a sterile Pyrex glass bottle approximately one-third full of solid sterile Pyrex glass beads. The bottle was then aseptically sealed and was rolled on its side for a period of about eighteen hours after which the milled mixture was aseptically separated from the beads by draining on a perforated plate of a sterile Buchner funnel. The resulting sterile suspension of 9α-fluorohydrocortisone tertiary-butylacetate is suitable for parenteral injection, for example, into the articular cavity of a rheumatic joint.

In the same manner, suspensions of mixtures of 9α-fluorohydrocortisone acetate and 9α-fluorohydrocortisone tertiary-butylacetate can be prepared in which a portion of the tertiary-butylacetate ester is replaced by an equivalent amount of the acetate ester. Such suspensions can also be utilized for parenteral injection.

EXAMPLE 4

*Ophthalmic suspension of 9α-fluorohydrocortisone tertiary-butylacetate*

A 2.5% ophthalmic suspension of 9α-fluorohydrocortisone tertiary-butylacetate was prepared using the glass-bead wet milling technique described in Example 2. This suspension contained—

| | | |
|---|---|---|
| 9α-fluorohydrocortisone tertiary-butylacetate | g. | 40 |
| Tween 80 | g. | 0.320 |
| Zepheran chloride (a 12.8% solution of high molecular weight alkyl-dimethyl benzyl ammonium chlorides) | cc. | 2.6 |
| $NaH_2PO_4.H_2O$ | g. | 7.2 |
| $Na_2HPO_4$-anhydrous | g. | 7.5 |
| Sodium chloride | g. | 7.7 |
| Sodium citrate.$2H_2O$ | g. | 1.6 |
| Benzyl alcohol | g. | 8.0 |
| Carbowax 4000 (solid polyethylene glycol) | g. | 160.0 |
| Water to make 1600 cc. | | |

By aseptically diluting the 2.5% suspension shown above with the required amount of aqueous vehicle, a 0.5% ophthalmic suspension is prepared.

EXAMPLE 5

*Ophthalmic ointment containing 9α-fluorohydrocortisone tertiary-butylacetate*

| | Gm. |
|---|---|
| 9α-fluorohydrocortisone tertiary-butylacetate, sterile, freeze dried | 150 |
| Liquid petrolatum U. S. P. | 250 |
| White petrolatum U. S. P. | 600 |
| | 1000 |

The ointment was prepared by incorporating the sterilized mixed petroleum bases with the previously pulverized hydrocortisone ester until a homogeneous mixture was obtained.

EXAMPLE 6

*Topical ointments containing 9α-fluorohydrocortisone tertiarybutylacetate*

| Composition | 1% | 2.5% |
|---|---|---|
| | gm. | gm. |
| 9α-Fluorohydrocortisone Tertiary-Butyl-acetate | 0.0100 | 0.0250 |
| Zinc Stearate | 0.078 | 0.0630 |
| Propylene Glycol | 0.3070 | 0.3070 |
| Carbowax 1500 (polyethylene glycol) | 0.3800 | 0.3800 |
| Carbowax 4000 (polyethylene glycol) | 0.1800 | 0.1800 |
| Distilled Water | 0.0450 | 0.0450 |
| | 1.0000 | 1.0000 |

A slurry of the 9α-fluorohydrocortisone tertiary-butylacetate and zinc stearate in the propylene glycol and water was added to the melted carbowaxes. The resulting mixture was blended on a roller mill to a smooth uniform ointment and then subdivided into jars or tubes.

Although the concentrations of the active ingredient in the pharmaceutical preparations can be varied within wide limits, it is preferred that the 9α-fluorohydrocortisone tertiary-butylacetate be present in an amount ranging from about 0.1 to 25% by weight of the composition. The particular amount depends on the pharmaceutical vehicle and the use intended. Vehicles containing from about 1 to 5% of the active ingredient have been found to be particularly satisfactory.

Any departure from the above description which conforms to the present invention is intended to be included within the scope of the claims.

What is claimed is:

1. 9α-fluoro-4-pregnene-11β,17α,21-triol-3,20-dione 21-tertiary-butylacetate.

2. Compositions comprising mixtures of 9α-fluoro-4-pregnene-11β,17α,21-triol-3,20-dione 21-tertiary-butylacetate and a pharmaceutical carrier.

3. A process which comprises reacting 9α-fluoro-4-pregnene-11β,17α,21-triol-3,20-dione with tertiary-butylacetyl chloride in the presence of a base to produce 9α-fluoro-4-pregnene-11β,17α,21-triode-3,20-dione 21-tertiary-butylacetate.

4. A process which comprises reacting 9α-fluoro-4-pregnene-11β,17α,21-triol-3,20-dione in a mixture of anhydrous pyridine and dimethylformamide with tertiary-butylacetyl chloride to produce 9α-fluoro-4-pregnene-11β,17α,21-triol-3,20-dione 21-tertiary-butylacetate.

5. A process which comprises reacting 9α-fluoro-4-pregnene-11β-17α,21-triol-3,20-dione in anhydrous pyridine with tertiary-butylacetyl chloride to produce 9α-fluoro-4-pregnene-11β,17α,21-triol-3,20-dione 21-tertiary-butylacetate.

No references cited.